United States Patent Office 3,165,524
Patented Jan. 12, 1965

3,165,524
PRODUCTION OF 7,14-DIOXO-5,7,12,14-TETRA-
HYDROQUINOLINO-(2,3-b)-ACRIDINES
Alfred Schuhmacher and Alfred Ehrhardt, Ludwigshafen (Rhine), Germany, assignors to Badische Anilin- & Soda-Fabrik Aktiengesellschaft, Ludwigshafen (Rhine), Germany
No Drawing. Original application July 18, 1961, Ser. No. 124,896. Divided and this application Apr. 5, 1963, Ser. No. 275,785
Claims priority, application Germany, Nov. 8, 1960, B 60,097
3 Claims. (Cl. 260—279)

This invention relates to a process for the production of 7,14-dioxo-5,7,12,14-tetrahydroquinolino-[2,3-b]-acridines according to which 2,5-dianilinoterephthalic acids, that may bear halogen atoms and/or low molecular weight alkyl groups on the aniline radical, are heated with compounds containing halogencarbonyl groups or more highly halogenated preliminary stages thereof, preferably in the presence of inert organic solvents and/or diluents, to temperatures of about 140° C. to about 250° C.

Compounds containing halogencarbonyl groups or more highly halogenated preliminary stages thereof include above all aromatic carboxylic acid halides, such as benzoyl chloride, or more highly halogenated preliminary stages of aromatic carboxylic acid halides, as for example benzotrichloride, or carbonyl chloride (phosgene).

Of the 2,5-dianilinoterephthalic acids that may bear halogen atoms and/or low molecular weight alkyl radicals on the aniline radical, unsubstituted 2,5-dianilinoterephthalic acid, 2,5 - di - (p - toluidino)-terephthalic acid and 2,5-di-(p-chloranilino)-terephthalic acid are of special technical interest for the new process.

7,14-dioxo - 5,7,12,14 - tetrahydroquinolino-[2,3-b]-acridine (linear-trans-quinacridone) and its symmetrical substitution products with two alkyl groups, two alkoxy groups and two or four halogen atoms are known to be valuable orange, red or violet pigments which are distinguished by outstanding light fastness and excellent resistance to temperature, weathering, solvents and softeners. From the basic substance of this series of dyes, which has the structure:

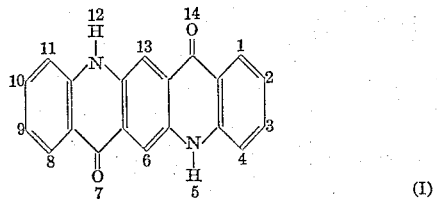

(I)

numerous substitution products may be derived which bear in the positions 1 to 4 and 8 to 11 radicals, such as methyl groups, methoxy groups or halogen atoms, for example chlorine or bromine atoms. Examples of such compounds are 1,8-dimethyl-linear-trans-quinacridone, 2,9-dibromo-linear-trans-quinacridone or 2,4,9,11-tetrachloro-linear-trans-quinacridone.

The linear-trans-quinacridones are as a rule obtained either from the corresponding 6,13-dihydroquinacridones by dehydrogenation or from the corresponding 2,5-dianilinoterephthalic acids by ring closure with the splitting off of water. While the production of 6,13-dihydroquinacridones by heating 2,5-dianilino-3,6-dihydroterephthalic acid esters in high boiling point inert solvents at 225° to 300° C. in many cases gives only moderate yields, it is as a rule possible to prepare dianilinoterephthalic acids in almost quantitative yields by simultaneous dehydrogenation and saponification of 2,5-dianilino-3,6-dihydroterephthalic acid esters in aqueous-alkaline liquids at 80° to 150° C. with or without the addition of alcohols or glycols. The 2,5-dianilinoterephthalic acids and their substitution products are therefore readily accessible initial materials for the commercial production of linear-trans-quinacridones.

The processes according to the equation:

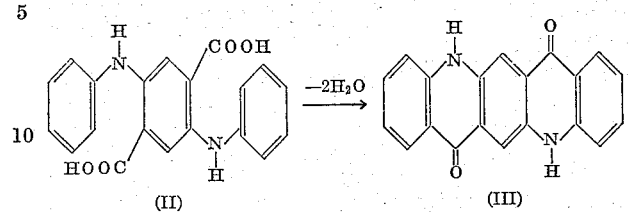

hitherto used for the conversion of 2,5-dianilinoterephthalic acids into linear-trans-quinacridones, however, have certain disadvantages. The sulfuric acids of various concentrations or various sulfur trioxide contents usual as condensing agents for the ring closure reactions with the splitting off of water in many cases have a sulfonating effect at the necessary reaction temperature of about 0° to about 100° C. or more. According to the process of the Belgian Patent No. 579,526 therefore, the sulfonic acid or sulfonic acid chloride groups introduced by ring closure in sulfuric acid or chlorosulfonic acid are split off again at a temperature of about 200° C. with dilute aqueous mineral acids. This method gives good yields of crude quinacridone, but only small amounts of pure linear-trans-quinacidone of the Formula III are obtained therefrom after the usual purification by way of the sulfate.

For the production of quinacridones, especially of unsubstituted quinacridones, there have been proposed in the literature, for example in the periodical Liebigs Annalen, 518 (1935), on page 245 the treatment of the acid chloride of dianilinoterephthalic acid with aluminum chloride and the heating of dianilinoterephthalic acid with a solution of hydrogen bromide in glacial acetic acid or with phosphorus pentoxide in tetrahydronaphthalene or cymene as solvent and zinc chloride fusion of dianilinoterephthalic acid at 175° to 220° C. or boric acid fusion of dianilinoterephthalic acid at 270° to 350° C. However, all these methods give the linear-trans-quinacridones in bad yields or insufficiently pure. Moreover, at the fairly high temperatures sometimes required, the above-mentioned ring closing agents attack the material of the reaction vessels to such an extent that commercial operation of the reaction is uneconomical. Phosphorus pentoxide in the form of polyphosphoric acids behaves more favorably as ring closing agent. When using these acids with a phosphorus content of about 75 to 85%, as is known from Belgian Patents Nos. 579,525, 580,924, 683,317 and 586,007, for the ring closure of dianilinoterephthalic acids it is as a rule necessary to use temperatures of only about 100° to about 200° C. However, the complicated methods of preparation of the polyphosphoric acids, for example by concentration of aqueous phosphoric acids or by addition of phosphorus pentoxide to phosphoric acids, as well as their corrosive action on metallic and ceramic materials, present obstacles to their commercial application.

The art is furthermore aware of the transfer, known from Belgian Patent No. 579,526, of the benzenesulfonic acid fusion used by R. School and W. Neovius (Ber., 44, 1079 (1911)) in the ring closure of benzoylbenzoic acids sensitive to sulfonation to anthraquinones, to the quinacridone ring closure of dianilinoterephthalic acids, in which lower alkylsulfonic acids, benzene disulfonic acids and naphthalene sulfonic acids may also be used instead of benzene sulfonic acid. It has been found, however, that in this process, in which the sulfonic acids heated to 100° to 200° C. serve at the same time as solvents, the yields of pure linear-trans-quinacridone are less than 50% of the theory. Moreover, the quinacridone obtained according to this process contains small amounts of impurities which make difficult the conversion of the dye into a form suitable for pigment purposes.

According to the statements of Libermann in the periodical Liebigs Annalen, 518 (1935), on page 247, it is possible to benzoylate 2,5-dianilinoterephthalic acids with the aid of benzoyl chloride, but it is not possible to convert them by ring closure into the corresponding linear-trans-quinacridones.

We have now found that, contrary to expectation, 7,14-dioxo - 5,7,12,14 - tetrahydroquinolino - [2,3-b] - acridines (linear-trans-quinacridones) are obtained in excellent yield and purity by heating a 2,5-dianilinoterephthalic acid which may bear one or more halogen atoms and/or low molecular weight alkyl groups on the aniline radical, with aromatic carboxylic acid halides or more highly halogenated preliminary stages thereof, preferably in the presence of inert organic solvents and/or diluents, to temperatures of about 140° to about 250° C.

Mixtures of two or more aromatic carboxylic acid halides, such as chlorides or bromides, or more highly halogenated preliminary stages thereof, and/or mixtures of two or more solvents and/or diluents may also be used.

It is advantageous to use benzoyl chloride as the carboxylic acid halide and to carry out the reaction according to this invention at temperatures between 140° and 250° C.

In this case, the yellow benzoyl derivative is first formed from the unsubstituted 2,5-dianilinoterephthalic acid and the benzoyl derivative then changes into the desired red linear-trans-quinacridone by splitting off benzoic acid.

When working in the absence of an inert organic solvent and/or diluent, it is advantageous to use a weight ratio of 2,5-dianilinoterephthalic acid to benzoyl chloride of about 1:3 to 1:4. Upon heating the reaction mixture, a yellow-brown solution is formed at 120° C. with strong evolution of hydrogen chloride. At 140° C. the red linear-trans-quinacridone by splitting off benzoic acid. tion. The reaction proceeds especially rapidly at the boiling point of the benzoyl chloride.

It is preferable to work in the presence of one or more organic solvents and/or diluents which are inert under the reaction conditions, for example agents of high boiling point, such as nitrobenzene, trichlorobenzene, N-methyl-pyyolidone or naphthalene. The initial materials are stirred with a high boiling point organic inert agent at temperatures between 140° C. and the boiling point of the agent, advantageously at temperatures between about 170° and 200° until conversion to the linear-trans-quinacridone is complete. About one to twenty-four hours is usually necessary, depending on the reaction temperature applied. It is advantageous to start from at least 2 moles, preferably 2.2 to 3 moles, of benzoyl chloride for every mole of 2,5-dianilinoterephthalic acid. The linear-trans-quinacridone deposited from the reaction mixture can be separated in a simple way by suction filtration. The impurities remain in the filtrate.

It is also advantageous first to heat the 2,5-dianilinoterephthalic acid with an organic inert solvent and/or diluent to elevated temperatures, for example of 150° to 190° C., and only then to introduce the benzoyl chloride into the heated mixture in small portions.

We have further found that 7,14-dioxo-5,7,12,14-tetrahydroquinolino - [2,3 - b] - acridines (linear - trans-quinacridones) are obtained in outstanding yields and purity by the abovementioned process by using more highly halogenated preliminary stages of the aromatic carboxylic acid halides instead of the aromatic carboxylic acid halides themselves.

By the phrase "more highly halogenated preliminary stages of aromatic carboxylic acid halides" as used in the present specification we understand aromatic carboxylic acid halides, in which the acyl oxygen is substituted by halogen. It is advantageous to use the highly halogenated preliminary stage of benzoyl chloride, benzotrichloride, for this new process.

It is of special technical interest to start from 2,5-dianilinoterephthalic acid and to work in the presence of inert organic solvents and/or diluents, preferably nitrobenzene. Unsubstituted linear-trans-quinacridone is thus obtained in an almost quantitative yield.

We have finally found that 7,14-dioxo-5,7,12,14-tetrahydroquinolino - [2,3-b] - acridines linear - trans - quinacridones) are obtained in outstanding yields and purity by heating 2,5-dianilinoterephthalic acids, preferably bearing halogen atoms and/or low molecular weight alkyl groups on the aniline radical, with phosgene in the presence of inert organic solvents and/or diluents to temperatures of about 140° to about 250° C.

Mixtures of two or more solvents and/or diluents may also be used.

In the new process, it is preferable to work in the presence of one or more high boiling point organic solvents and/or diluents which are inert under the reaction conditions, for example nitrobenzene, trichlorobenzene, N-methylpyrrolidone or naphthalene. The initial materials are stirred together with phosgene and a high boiling point organic inert agent at temperatures between 140° C. and the boiling point of the agent, advantageously at temperatures between about 170° and 200° C., until the reaction to the linear-trans-quinacridone is complete. About 4 to 8 hours is necessary as a rule depending on the reaction temperature. As a rule, at least 2 moles, preferably 2 to 4 moles, of phosgene is used for every mole of 2,5-dianilinoterephthalic acid. The linear-trans-quinacridone deposited in crystalline form from the reaction mixture can be separated in a simple way by suction filtration. The impurities remain in the filtrate.

This new process is of special technical interest when starting from 2,5-di(p-chloranilino)-terephthalic acid and using nitrobenzene as solvent.

The last-mentioned new process may also be carried out advantageously by first heating the 2,5-dianilinoterephthalic acid with an organic inert solvent and/or diluent to elevated temperatures, for example of 150° to 190° C. and only then leading the phosgene into the heated mixture in small portions.

The invention is illustrated by, but not limited to, the following examples in which the parts and percentages are weight units. This application is a division of Serial No. 124,806.

*Example 1*

100 parts of 2,5-dianilinoterephthalic acid is heated with 200 parts of benzoyl chloride and 400 parts of nitrobenzene to 175° to 180° C. within an hour. The mixture is stirred for 15 hours at this temperature and then allowed to cool to 100° C. The deposited crude reaction product is filtered off by suction, washed with nitrobenzene at 100° C. and then with methanol and dried at 100° C. 87.4 parts of linear-transquinacridone is thus obtained in the form of red crystals which carbonize above 400° C. This is a yield of 97.5% of the theory.

If the reaction mixture is stirred for only 3 to 5 hours at 175° to 180° C. instead of for 15 hours, the linear-trans-quinacridone is obtained in a yield of more than 90% of the theory.

*Example 2*

100 parts of 2,5-dianilinoterephthalic acid and 300 parts of benzoyl chloride are stirred together for an hour at 175° to 180° C. Then 300 parts of trichlorobenzene is added to the mixture and the mixture kept at the said temperature for another three hours. The deposited crystals are filtered off by suction from the reaction mixture at 100° C. and then washed with hot trichlorobenzene. 77 parts of linear-trans-quinacridone are obtained, i.e. 86% of the theory.

Example 3

A mixture of 100 parts of 2,5-dianilinoterephthalic acid and 400 parts of benzoyl chloride is stirred for 24 hours at 160° to 165° C. The mixture is diluted with 300 parts of chlorobenzene, the reaction product immediately filtered off by suction and washed with hot chlorobenzene. 82 parts of linear-trans-quinacridone is obtained, i.e., 91% of the theory.

Example 4

100 parts of 2,5-dianilinoterephthalic acid and 500 parts of benzoyl chloride are stirred together for 16 hours at 170° C. The reaction mixture is filtered off by suction at 100° C. without dilution and the filtered residue washed with hot dichlorobenzene. 75.2 parts of linear-trans-quinacridone is obtained, i.e., 84% of the theory.

Example 5

100 parts of 2,5-dianilinoterephthalic acid and 300 parts of benzoyl chloride are heated together for an hour at the boil. The reaction mixture is diluted with 300 parts of trichlorobenzene and filtered off by suction at 100° C. After washing the filter residue with hot trichlorobenzene, 72.8 parts of linear-trans-quinacridone is obtained, i.e., 81% of the theory.

Example 6

100 parts of 2,5-dianilinoterephthalic acid and 500 parts of nitrobenzene are heated to 170° to 175° C. while stirring. Then 100 parts of benzoyl chloride is allowed to flow into the mixture in the course of an hour. The mixture is then stirred for 5 hours at 175° to 180° C. and the reaction product filtered off at 110° C. The filter residue is washed with hot nitrobenzene until the latter remains pale. Then the residue is washed free from nitrobenzene with methanol. The yield is 85.3 parts of linear-trans-quinacridone, i.e., 95% of the theory.

Example 7

100 parts of benzoyl chloride is allowed to run in the course of 1 to 2 hours at 175° C. into a mixture of 100 parts of 2,5-dianilinoterephthalic acid and 400 parts of naphthalene. As soon as the reaction is complete (as a rule after about 3 to 5 hours) the reaction product is filtered off by suction at 120° C. and washed with hot naphthalene. 76 parts of linear-trans-quinacridone is obtained, i.e., 85% of the theory.

Example 8

30 parts of 2,5-di-(p-toluidino)-terephthalic acid is suspended in 150 parts of nitrobenzene. At 170° C., 28 parts of benzoyl chloride is allowed to flow in in one hour. After stirring for 5 hours at 175° to 180° C., the deposited crystals are filtered off at 110° C., washed with hot nitrobenzene and with methanol and dried at 100° C. 25 parts of linear-trans-2,5-dimethylquinacridone is obtained, i.e., 92.5% of the theory.

Example 9

250 parts of 2,5-di-(p-chloranilino)-terephthalic acid is stirred with 230 parts of benzoyl chloride in 1000 parts of trichlorbenzene at 170° C. A dark brown solution is first formed, but red crystals soon separate from this solution. After the reaction has ended, the product is filtered off at 100° C. The filter residue is washed with trichlorobenzene and with methanol and dried. The yield is 205 parts, i.e., 90% of the theory.

Example 10

75 parts of o-chlorobenzoyl chloride is allowed to flow at 180° C. into 50 parts of 2,5-dianilinoterephthalic acid in 250 parts of nitrobenzene. After the reaction has ended, the linear-trans-quinacridone formed is filtered off by suction, washed with hot nitrobenzene and with methanol and dried. 36.8 parts of linear-trans-quinacridone is obtained, i.e., 82% of the theory.

Example 11

95 parts of 2,5-dichlorobenzoyl chloride is allowed to flow at 170° C. into 50 parts of 2,5-dianilinoterephthalic acid in 250 parts of nitrobenzene and the mixture stirred for 7 hours at 180° to 190° C. The reaction mixture is then allowed to cool to 100° C. The crystals deposited are filtered off by suction, washed with nitrobenzene and freed from adherent solvent by adding 25 parts of 50% aqueous caustic soda solution and treatment with steam. 38.2 parts of linear-trans-quinacridone is obtained, i.e., 85% of the theory.

Example 12

50 parts of 2,5-dianilinoterephthalic acid is dissolved in 200 parts of N-methylpyrrolidone and 75 parts of benzoyl chloride is allowed to run into the solution at 175° C. within one hour. The mixture is stirred for 8 hours at 180° to 190° C., red-brown crystals thereby being separated. These are filtered off by suction at 100° C., washed with N-methylpyrrolidone and dried. 30.6 parts of quinacridone is obtained, i.e., 68% of the theory.

Example 13

34.8 parts of 2,5-dianilinoterephthalic acid and 280 parts of nitrobenzene are heated while stirring to about 175° C. At this temperature, 34 parts of benzotrichloride is allowed to flow into the mixture in the course of an hour. The mixture is stirred for 5 hours at about 180° C. and the reaction product filtered off by suction at 150° C. The filter residue is washed with 120 parts of nitrobenzene at 140° C. until the filtrate runs away pale and then, with the addition of 15 parts of sodium carbonate, freed from adherent solvent with steam. 30.5 parts of linear-trans-quinacridone is obtained, i.e., 97.5% of the theory.

Example 14

41.7 parts of 2,5-di-(p-chloranilino)-terephthalic acid and 180 parts of nitrobenzene are heated together to 190° to 200° C. while stirring. At this temperature, phosgene is led into the mixture until di-(p-chloranilino)-terephthalic acid can no longer be detected therein. It is as a rule sufficient to lead about 8 to 12 parts of phosgene per hour into the mixture for about 4 to 8 hours. The mixture is then allowed to cool to 110° C. and the reaction product is filtered off by suction. The filter residue is washed first with nitrobenzene at 110° C. until the filtrate is pale and clear, and then with methanol until it is free from nitrobenzene. After drying at 100° C., 34.4 parts of linear-trans-dichloroquinacridone is obtained, i.e., 91% of the theory.

We claim:

1. A process for the production of 2,9-dichlor-7,14-dioxo - 5,7,12,14 - tetrahydroquinolino - [2,3-b]-acridine, which comprises heating 2,5-di-(p-chloranilino)-terephthalic acid with phosgene in the presence of an inert organic solvent to temperatures of about 140° C. to about 250° C.

2. A process as claimed in claim 1 wherein said inert organic solvent is a member selected from the group consisting of nitrobenzene, trichlorobenzene, naphthalene, N-methylpyrrolidone and mixtures thereof.

3. A process as claimed in claim 1 wherein the inert organic solvent is nitrobenzene.

No references cited.

UNITED STATES PATENT OFFICE
CERTIFICATE OF CORRECTION

Patent No. 3,165,524 January 12, 1965

Alfred Schuhmacher et al.

It is hereby certified that error appears in the above numbered patent requiring correction and that the said Letters Patent should read as corrected below.

Column 2, line 63, for "R. School" read -- R. Scholl --; column 3, lines 39 and 40, strike out "by splitting off benzoic acid. tion." and insert instead -- begins to separate from this solution. --.

Signed and sealed this 13th day of July 1965.

(SEAL)
Attest:

ERNEST W. SWIDER
Attesting Officer

EDWARD J. BRENNER
Commissioner of Patents